United States Patent [19]

Oshiage et al.

[11] 4,340,021
[45] Jul. 20, 1982

[54] IGNITION ADVANCE ANGLE CONTROLLING DEVICE

[75] Inventors: Katsunori Oshiage; Mitsuhiko Ezoe, both of Yokosuka, Japan

[73] Assignee: Nissan Motor Company, Ltd., Yokohama, Japan

[21] Appl. No.: 152,095

[22] Filed: May 21, 1980

[30] Foreign Application Priority Data

May 25, 1979 [JP] Japan ................................. 54-64624

[51] Int. Cl.$^3$ ................................. F02P 5/04
[52] U.S. Cl. .................................. 123/425; 123/435; 123/415
[58] Field of Search ......................... 123/425, 435, 415

[56] References Cited

U.S. PATENT DOCUMENTS

| | | | |
|---|---|---|---|
| 3,592,178 | 7/1971 | Schiff | 123/415 |
| 3,660,689 | 5/1972 | Oishi | 123/415 |
| 3,756,212 | 9/1973 | Schirmer | 123/415 |
| 4,002,155 | 1/1977 | Harned | 123/425 |
| 4,012,942 | 3/1977 | Harned | 123/425 |
| 4,061,116 | 12/1977 | Saida | 123/425 |
| 4,063,538 | 12/1977 | Powell | 123/425 |
| 4,102,310 | 7/1978 | Caron | |
| 4,106,447 | 8/1978 | West | |
| 4,153,020 | 8/1979 | King | 123/425 |
| 4,236,491 | 12/1980 | Hahori | 123/425 |

FOREIGN PATENT DOCUMENTS

| | | | |
|---|---|---|---|
| 2659239 | 7/1977 | Fed. Rep. of Germany | |
| 2274796 | 9/1976 | France | |
| 2374530 | 12/1977 | France | |
| 2030644 | 4/1980 | United Kingdom | 123/425 |

Primary Examiner—Ronald B. Cox
Attorney, Agent, or Firm—Lowe, King, Price & Becker

[57] ABSTRACT

A knocking sensor output signal of an ignition advance angle controlling device is subdivided in synchronism with the engine rotation into a knocking portion and a background portion. Both signal portions are rectified and averaged and the averaged portions are compared to derive a difference signal. The ignition advance angle is controlled to advance or to retard in response to said difference signal so as to obtain an optimum control of the advance angle in response to the amount of knocking.

4 Claims, 16 Drawing Figures

IGNITION ADVANCE ANGLE CONTROLLING DEVICE

BACKGROUND OF THE INVENTION

1. Field of the Invention

The present invention relates to an ignition advance angle controlling device for detecting knocking produced in an engine and for controlling the ignition advance angle to be a suitable value according to the amount of the knocking.

2. Description of the Prior Art

Fuel consumption and engine power output characteristics of an internal combustion engine are improved by advancing the ignition timing (the advance angle is increased) to an extent causing a suitable slight knocking state. However, since the optimum ignition advance angle varies according to the loading condition of the engine, a certain advance angle that may be optimum under a certain loading condition may be too large under another loading condition to cause much higher knocking. Such a much higher knocking affects the engine life. To solve the problem a device has been proposed to decrease the ignition advance angle at a time when a strong knocking state exceeding a predetermined level is detected.

Figure 1:
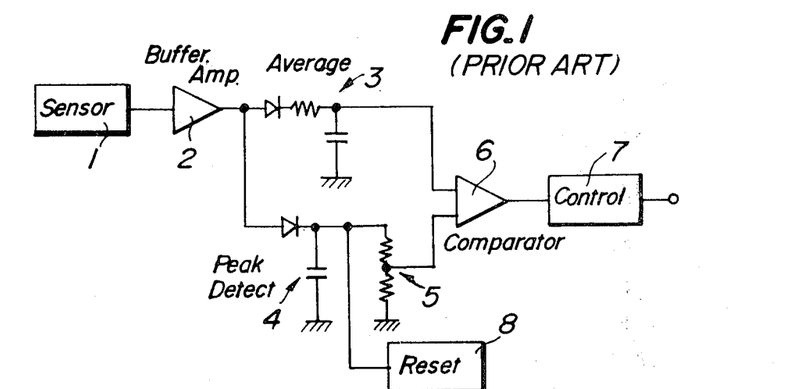
FIG. 1 is a circuit diagram, partly in block form, of a conventional device as described supra.
Figure 2:
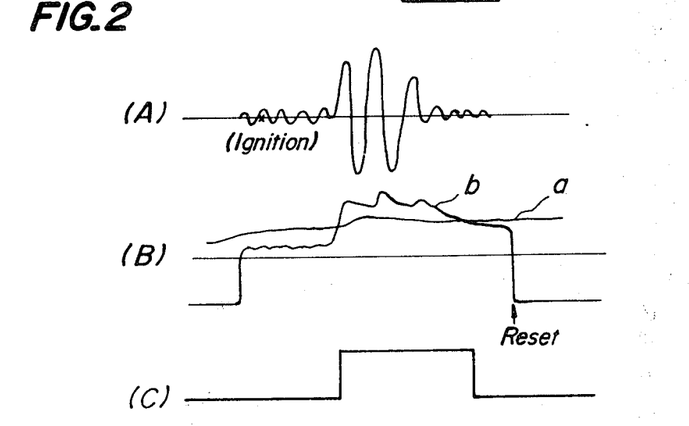
FIGS. 2A, 2B and 2C are illustrations of signal waveforms of the circuit of FIG. 1

FIG. 1 is a circuit diagram of one such known device including a knocking sensor 1 mounted on or adjacent an engine for detecting engine vibration which is substantially caused by knocking. Sensor 1 derives an electric signal having the waveform shown in FIG. 2, line (A). The signal derived from sensor 1 is applied to 2 is an amplifier or buffer 2, which drives averaging circuit 3 and peak detector 4 in parallel averaging circuit 3 derives a DC output signal having a mean or average value of a half wave rectified replica of the output signal of the sensor 1. Peak detecting circuit 4 detects peak values of the output signal of the knocking sensor 1 and holds the detected peak value. The held detected peak value is applied by circuit 4 to resistive voltage divider 5 having a tap for supplying one input signal to comparator 6, also responsive to the output signal of circuit 3. Comparator 6 compares the output signal of the averaging circuit 3 shown in FIG. 2(B) by waveform a and an output of the peak detecting circuit 4 shown in FIG. 2(B) by waveform b to derive a bilevel waveform (FIG. 2(C)). The positive portion of the waveform of FIG. 2(C) is derived in response to divided amount of the peak value exceeding the mean average value. An ignition advance angle controlling circuit 7 retards the ignition advance angle in response to the output of the comparator 6. Reset circuit 8 resets the peak value detected by circuit 4 each time there is an ignition or at a predetermined time interval.

If knocking occurs in an engine controlled by the prior art circuit having substantially the aforementioned basic construction, peak detecting circuit 4 derives a relatively high amplitude output signal, which is much larger than the mean value of the output of the knocking sensor 1 derived when knock does not occur; the divided signal value derived from divider 5 may also exceed the mean value. Accordingly, each time a knock occurs, an output signal is derived from the comparator 6 and the ignition advance angle is retarded by a certain small amount to prevent occurrence of a very strong knock.

In the known device, the ignition advance angle is immediately reduced by a predetermined amount when a knock exceeding a certain amount is detected. The advance angle is reduced by the same amount even if there is a difference in the knock level. Therefore the advance angle is excessively decreased for slight knocks but may be insufficient for strong knocks and be unable to prevent the strong knocks. If the ignition advance angle is excessively decreased, the fuel consumption and the output power characteristics are still inferior. In accordance with this invention, these problems are substantially rectified.

SUMMARY OF THE INVENTION

The present invention improves the aforementioned problems of the prior art devices. In accordance with the present invention, the occurrence times of each ignition pulse of an internal combustion engine are controlled by a sensor for detecting vibration produced by the engine. The sensor derives an output signal including background and knock portions while the engine is knocking. A signal splitter splits the output signal of the sensor into a knocking portion signal and a background portion signal separate from the knocking portion signal. A first means respective to the knocking portion signal derives a first signal having a value commensurate with the intensity of the detected knocking. A second means responsive to the background portion signal derives a second signal having a value commensurate with the intensity of the detected background variations. A comparison signal derived in response to the first and second signal has a value commensurate with the relative magnitudes of the intensities of the detected knock and background variations. A pulse is derived each time ignition of the engine occurs. In response to the comparison and the length of the interval between first and second immediately adjacent ignition pulses the occurrence time of a third ignition pulse of the engine is controlled. The third ignition pulse occurs immediately following the second ignition pulse so that the third ignition pulse occurrence time can be changed by a variable amount determined by the relative magnitudes of the intensities of the detected knock and background variations between the first and second pulses. The signal splitter includes first and second switches for alternately coupling the output of the sensor to the first and second means in response to the sensor respectively deriving the knock and background portions. The signal splitter includes means for deriving an intermediate signal having an increasing magnitude as time progresses between each ignition pulse. The rate of increase of the intermediate signal is responsive to the time interval between adjacent ignition pulses so the rate of increase is an increasing function of the time interval. In response to the magnitude of the intermediate signal being in a first band, between first and second predetermined amplitude signals, the knock portion is coupled via the first switch to the first means while blocking coupling of the background portion via the second switch to the second means. In response to the intermediate signal being in a second band outside of the first band, the background portion is coupled to the second means via the second switch while blocking coupling of the knock portion via the first switch to the first means. The present invention therefore provides an ignition advance angle controlling device wherein strong knocking can be avoided while maintaining fuel consumption and engine output characteristics, without substantial engine deterioration.

DESCRIPTION OF THE PREFERRED EMBODIMENT

The invention will now be described with reference to the illustrated preferred embodiments by referring to the accompanying drawings.

Figure 3:
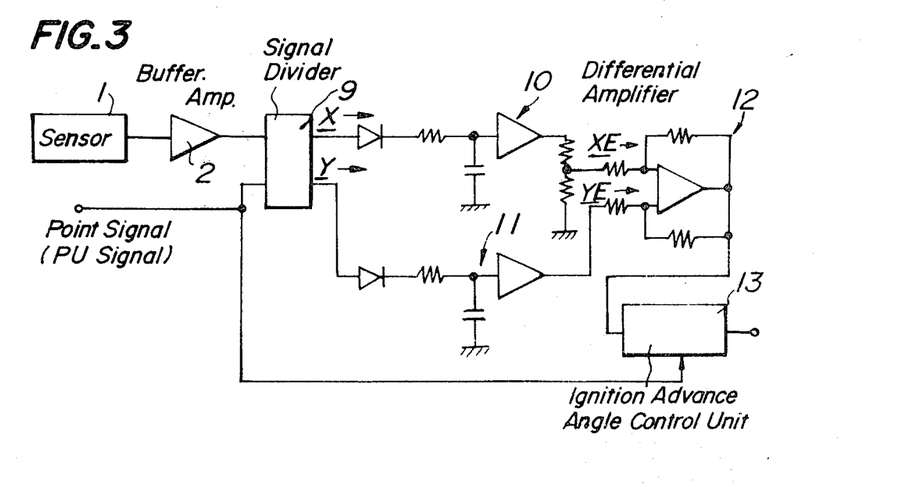
FIG. 3 is a circuit diagram, partly in block form, of an ignition advance angle controlling device according to the present invention.

FIG. 3 is a circuit diagram of one embodiment of the present invention, including a conventional sensor 1 that derives buffer amplifier 2. The output signal of sensor 1 after passing through buffer amplifier 2 is divided by signal splitter 9 into two portions i.e. the knocking portion and an other portion, termed a background portion. The knocking signal portion and the background signal portion are respectively applied to rectifying and averaging circuits 10 and 11 that rectify and average them. The difference between the two output signals of circuits 10 and 11 is derived by differential amplifier 12. Advance angle controlling circuit or unit 13 controls ignition advance angle in response to the output voltage of differential amplifier 12.

The signal splitter 9 responds to a signal synchronized with the rotation of the engine derived, for instance, by a mechanical switch in the engine distributor. The signal synchronized with engine rotations alternatively controls coupling of the output signal to the rectifying and averaging circuits 10 and 11. This is based on the fact that the the knocking occurrence time is closely related to the engine rotation. It is also possible to control splitter 9 in response to an electronic switch driven by a point signal or a pick-up signal PU derived from a fully transistorized control circuit unit. Each of rectifying and averaging circuits 10 and 11 respectively half-wave rectifies the signal fed from the splitter 9, and takes the average value for an appropriate time interval. The averaging time interval determined by a time constant of the averaging circuit must be suitable for the engine operation. Hunting of the advance angle may result if the time constant is too small and the response characteristic is spoiled if it is too large.

In the differential amplifier 12, the output voltage of the rectifying and averaging circuit 10 for the knocking portion of the signal is subtracted from the output voltage of the rectifying and averaging circuit 11 for the background signal; amplifier 12 derives an amplified replica of difference signal an output thereof. The advance angle control unit 13 generally provides an integration action based on the point signal or the pick-up signal PU as described in detail hereinafter. Control unit 13 also controls a slice level based on the output voltage of the differential amplifier 12 to vary the ignition timing for advancing the ignition angle continuously.

The operation of the circuit illustrated in FIG. 3 is now described.

Figure 4:
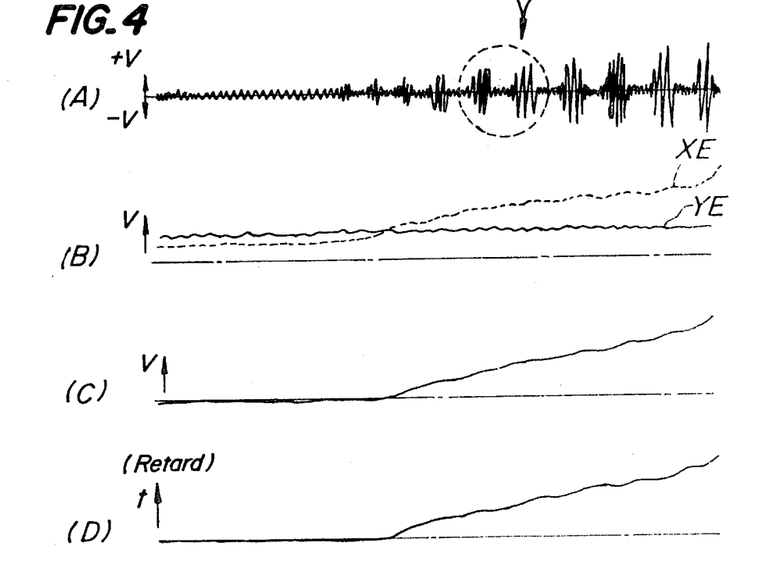
FIGS. 4 and 5 are illustrations of signal waveforms of the circuit of FIG. 3.
Figure 5:
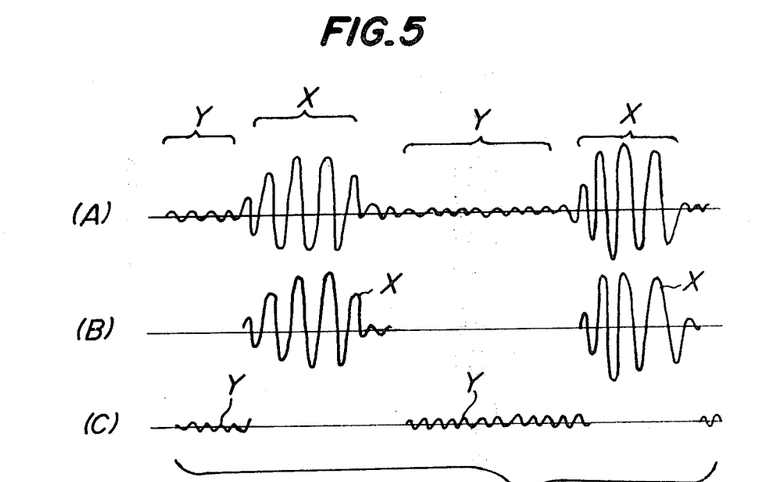

In response to knocking sensor 1 detecting engine vibration associated with knocking as shown in the waveform diagram of FIG. 4(A) and FIG. 5(A), having an enlarged scale, signal splitter 9 splits this waveform into two parts. The knocking portion X of the split signal is shown in FIG. 5(B) while the rest of the signal detector by sensor 1 namely, the background portion Y, is shown in FIG. 5(C). The knocking signal X is fed to the knocking portion rectifying and averaging circuit 10 and the background signal Y is supplied to the background portion rectifying and averaging circuit 11. In each of the circuits 10 and 11, the respective signals are rectified and averaged to derive knocking portion average voltage XE and background portion average voltage YE, (FIG. 4(B); voltages XE and YE are fed to the respective input of the differential amplifier 12. In differential amplifier 12, XE and YE signals are subtracted to provide a difference signal having a waveshape as shown in FIG. 4(C). This difference signal is fed to ignition advance angle control unit 13 to control the ignition advance angle of the engine to vary and retard the angle according to the knocking level as illustrated in FIG. 4(D) to obtain suitable control of the ignition timing.

Figure 6:
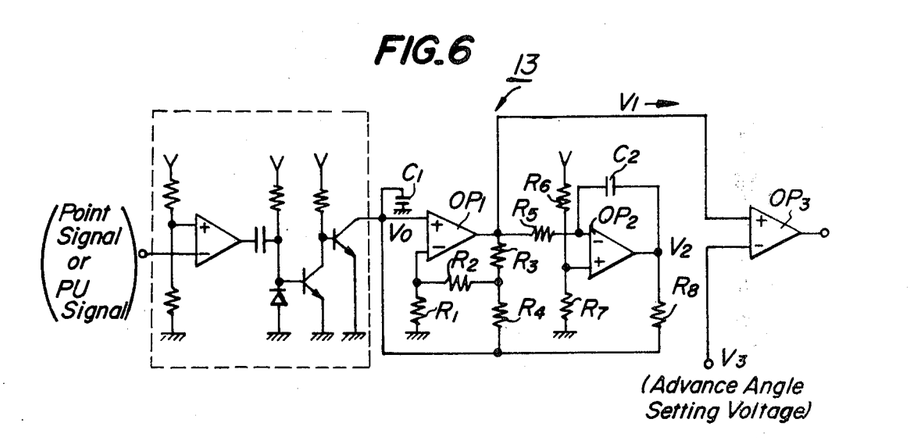
FIG. 6 is a circuit diagram of the control portion of the circuit of FIG. 3.
Figure 7:
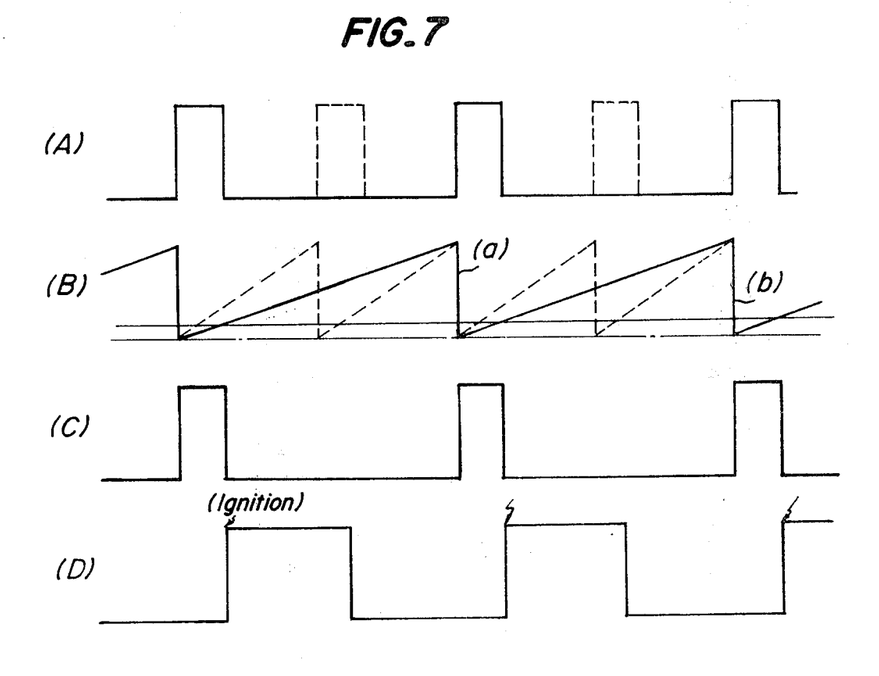
FIG. 7 is a signal diagram useful for describing the operation of the circuit shown in FIG. 6.

One embodiment of a practical circuit for the ignition advance angle control portion 13 is shown in FIG. 6. Further, in FIG. 7(A)–(D) are indications of various waveforms used in the controlling operation. FIG. 7(A) is a waveform for the point signal or the pick-up signal PU of a fully transistorized control unit fed to the input of circuit 13. The above point signal or PU signal shown in FIG. 7(A) is the trigger signal for starting an integrating operation shown in FIG. 7(B); and this integrating operation is continued until the succeeding trigger signal is applied to circuit 13. In this case, the trigger interval is changed by a variations of the engine rotation, the height of the sawtooth wave obtained by the integrating operation is maintained constant by the feedback applied thereto. The slice level shown by straight line (b) in FIG. 7(B) is controlled in response to the output voltage of differential amplifier 12. This slice level causes a rectangular pulse ignition exciting signal shown in FIG. 7(C) to be produced. Each trailing edge of a pulse of the ignition exciting signal (FIG. 7(C)) triggers the leading edge of a rectangular pulse ignition signal, FIG. 7(D); in other words the ignition timing is determined by the width and trailing edge occurrence time of the exciting signal (FIG. 7(C)); in turn controlled by slice level (b), FIG. 7(B). The slice level (b) is determined by the output of the differential amplifier 12. To this end, sawtooth voltage V1 and the slice level (b) from amplifier 12 are compared in operational amplifier OP3.

Figure 8:
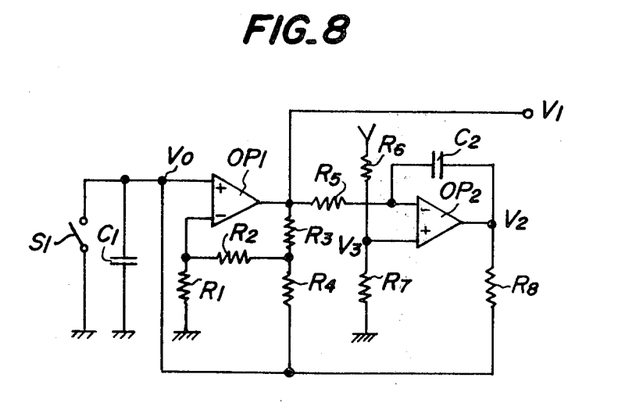
FIG. 8 is a simplified circuit of the circuit of FIG. 6.

Further details of the ignition advance angle control circuit 13 shown in FIG. 6 include on the left half of circuit diagram is a differential circuit that can be replaced by switch S1 and the circuit shown in FIG. 8. In FIG. 8, voltage voltage v0 across capacitor C1, that is selectively short circuited by switch S1, is applied to non-inverting input terminal of operational amplifier $OP_1$ that derives output voltage $V_1$, applied to an inverting input terminal of operational amplifier $OP_3$ in the final stage.

Figure 9:
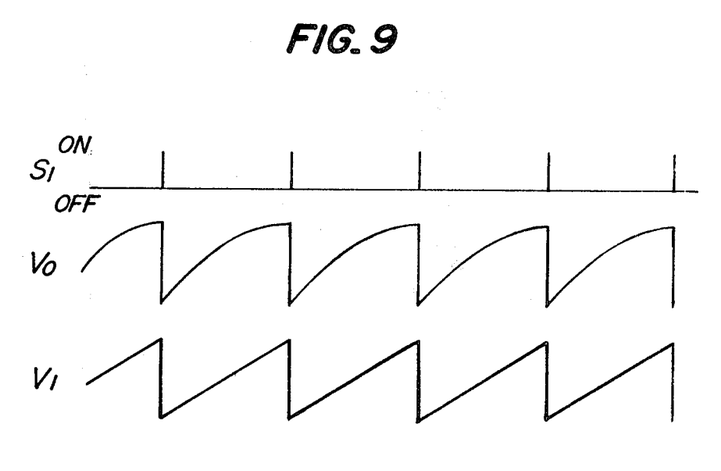
FIGS. 9 to 14 are illustrations of signal waveforms useful for describing the operation of the circuit shown in FIG. 8.

FIG. 9 includes waveforms of the voltages $v_0$ and $v_1$ when the time between adjacent closings of the switch $S_1$ is constant. Each time switch $S_1$ closes capacitor $C_1$ is discharged and voltage $V_0$ returned to ground. In response to switch $S_1$ opening, a positive DC voltage $v_2$ at the output terminal of amplifier $OP_2$ is coupled to the non-inverting input of amplifier $OP_1$ via resistor $R_8$, to charge capacitor $C_1$ so voltage $v_0$ rises exponentially. The exponential rise of voltage $v_0$ is converted into a substantially linear sawtooth $v_1$ by operational amplifier $OP_1$ having a positive feedback path including series resistors $R_3$ and $R_4$, as well as a negative feedback path including resistors $R_2$ and $R_3$. Sawtooth $v_1$ is converted into a substantially constant DC voltage by a relatively long time constant integrator formed by a condenser $C_2$, a resistor $R_5$ and an operational amplifier $OP_2$. Resistor $R_8$ and condenser $C_1$ from an integrator that is a first order delay system, cause waveform $v_0$ to have the shape shown in FIG. 9.

Figure 10:
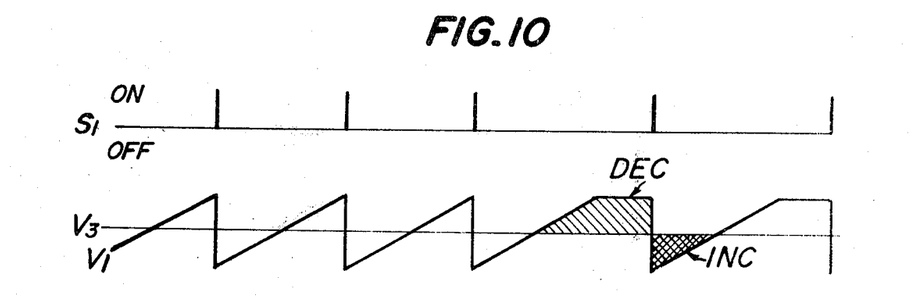

Next consider a case when the period between adjacent closures of the equivalent switch circuit $S_1$ is prolonged as indicated in FIG. 10 by the intervals between the 3rd, 4th and 5th closings of switch $S_1$. Under these circumstances voltage $v_1$ should have the form as shown in FIG. 10 whereby saturation action of amplifier $OP_1$ causes the 4th and 5th linear sawtooth waveforms to be terminated and voltage $v_1$ to remain constant.

Figure 11:
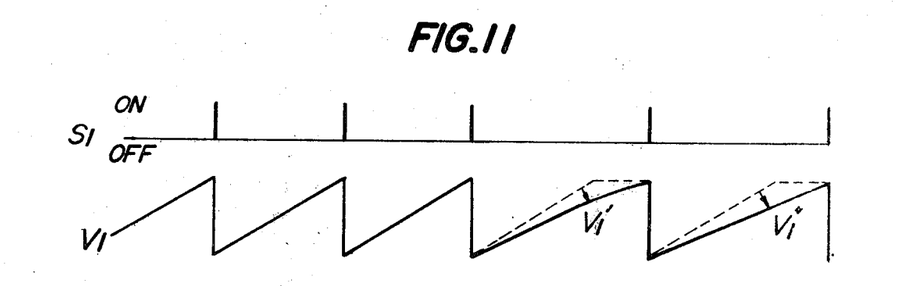

However, in practice the integrator formed by the condensor $C_2$, the resistor $R_5$ and the amplifier $OP_2$ produces a reversed output. Because the decrease DEC of the integrated voltage in FIG. 10 is larger than the increase INC of the integrated voltage (DEC>INC), the voltage $v_2$ decreases. Accordingly, the charging voltage to an integrator formed by the condensor $C_1$ and the resistor $R_8$ decreases, causing the slope of the voltage $v_1$ to decrease during the interval between the 4th and 5th closures of switch $S_1$ as shown by curve $v_1''$ in FIG. 11. During the interval between the 3rd and 4th closures of switch $S_1$ as shown at $V_1'$ voltage $v_1$ does not have straight wavefront. This is because of the response delay of the voltage $v_2$ in the circuit.

Figure 12:
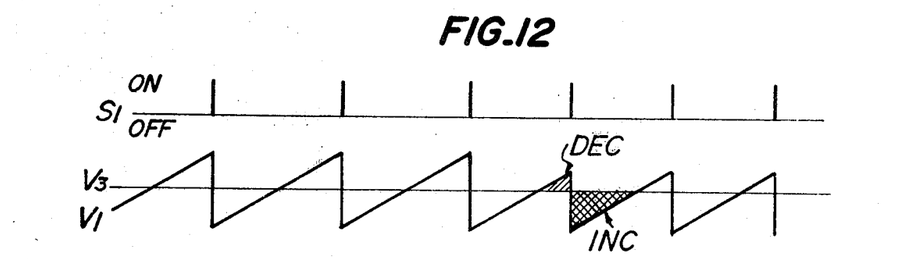
Figure 13:
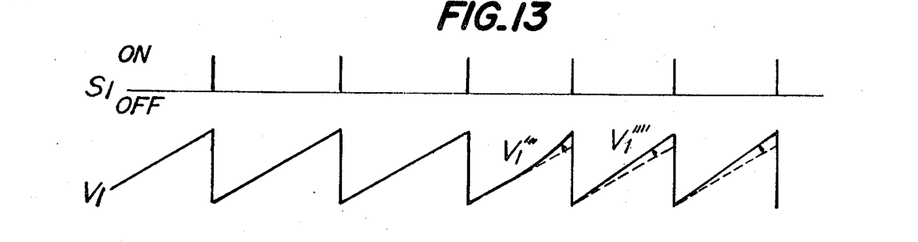

If the period between adjacent closures of switch $S_1$ decrease, the waveform for voltage $v_1$ is becomes as shown in FIG. 12, in which DEC>INC, causing the voltage $v_2$ increase and the slope of the waveform of the voltage $v_1$ to become steeper as shown curve $v_1'''$ in FIG. 13. The slope of the first wave shown by $v_1'''$ is not straight because of the time delay in response to the voltage $v_2$.

As described above, there is derived an integration signal $v_1$ having a constant wave height independent of the period between adjacent pulses. The integration interval is initiated in response to a trigger signal and ends in response to the next coming trigger signal.

Figure 14:
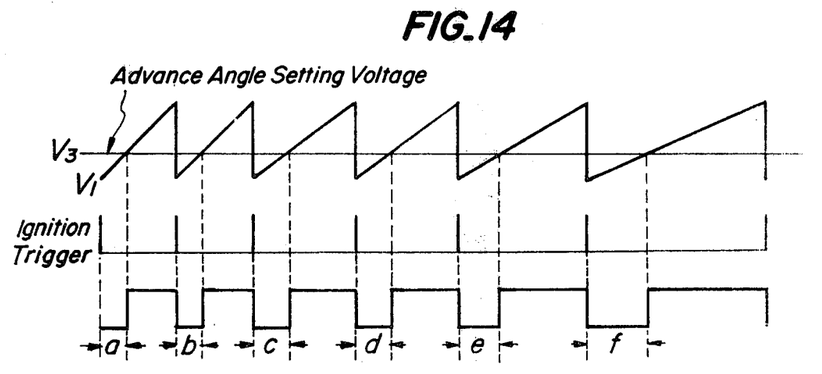

While the trigger signal is converted into the ignition signal, the signal $v_1$ is compared with a constant voltage $v_3$. The signals representing a constant angle that are derived from the ignition signal are obtained as seen from FIG. 14 wherein the constant voltage $v_3$ corresponds to the advance angle setting voltage.

Figure 15:
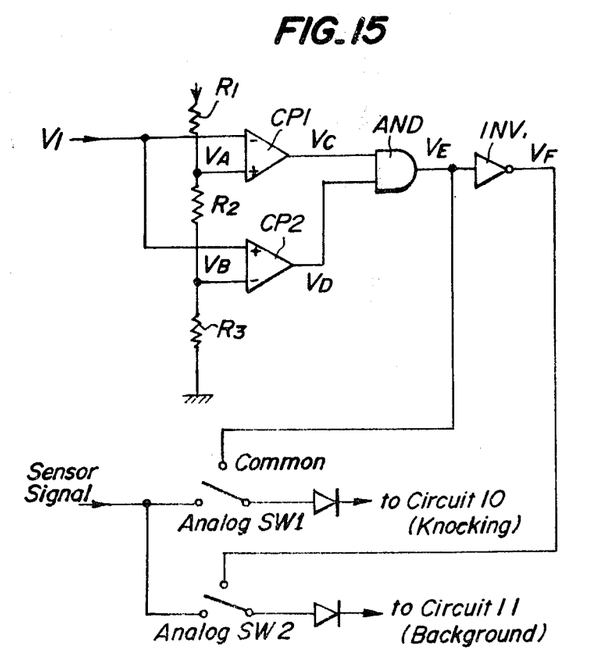
FIG. 15 is a more detailed circuit diagram of the signal divider circuit 9 shown in FIG. 3.

FIG. 15 is an illustration of a more detailed circuit of the signal splitter circuit 9, FIG. 3.

A knocking condition occurs during a period beginning at a certain angle after ignition and continues until the succeeding certain angle. During this period a knocking signal is fed to the knocking portion rectifying and averaging circuit 10 and the rest of the sensor signal is fed to the background portion rectifying and averaging circuit 11.

The voltage $v_1$ indicative of the constant advance angle is compared with two predetermined voltages $v_A$ and $v_B$ in comparators $CP_1$ and $CP_2$ that respectively derive constant angle signals $v_C$ and $v_D$. Signals $v_C$ and $v_D$ are combined in gate AND that derives a binary one value for signal $v_E$ in response to voltage $v_1$ exceeding voltage $v_A$ while voltage $v_B$ exceeds voltage $v_1$. Signal $v_E$ is complemented by inverter INV that derives signal $v_F$. Binary one levels for $v_E$ and $v_F$ close normally open circuited switches $SW_1$ and switches $SW_2$ driven in parallel by the signal from knocking sensor 1 to provide the split knock and background signals that are respectively applied to circuits 10 and 11.

Figure 16:
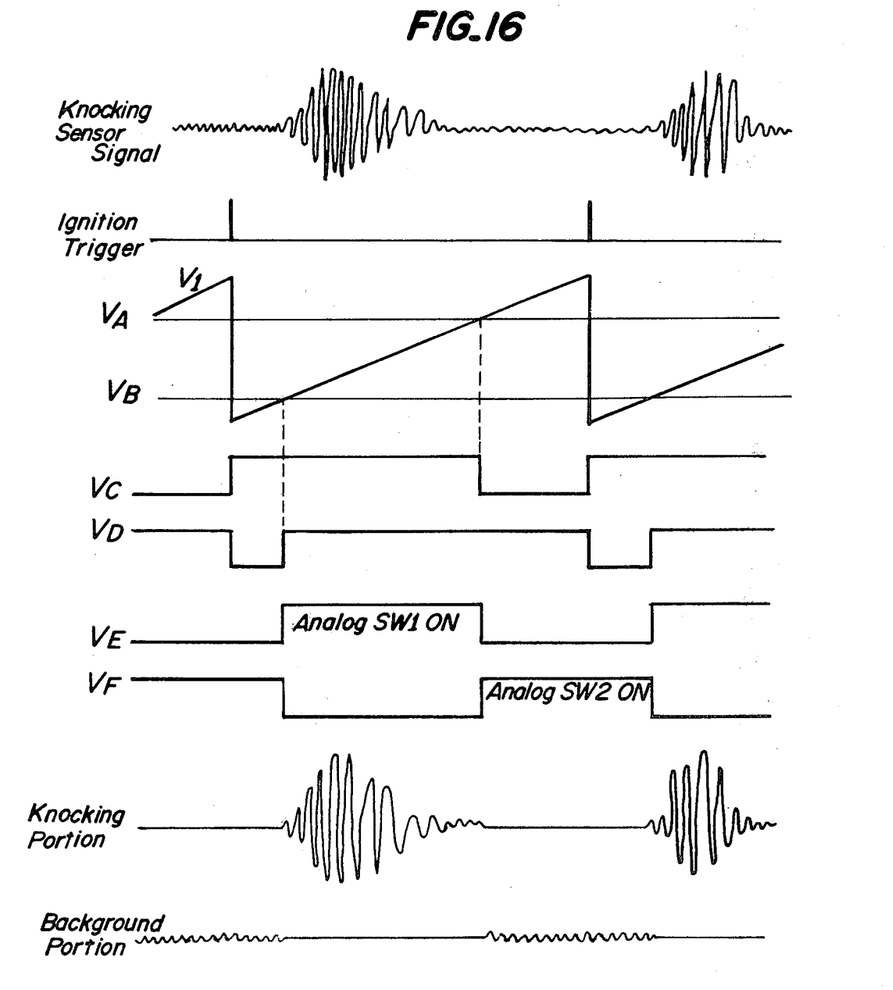
FIG. 16 is a waveform diagram useful for describing the operation of the circuit shown in FIG. 15.

In FIG. 16 the detected output of knock sensor 1 is illustrated as having substantially the same waveform as described with respect to FIGS. 4 and 5. Each knock variation is preceded by an ignition trigger that causes a short duration flyback of sawtooth voltage $v_1$ followed by initiation of a linear ramp voltage $v_1$. During flyback, voltage $v_1$ crosses voltage levels $v_A$ and $v_B$ causing positive and negative going transistions of voltages $v_C$ and $v_D$ at the outputs of comparators $CP_1$ and $CP_2$, respectively. Shortly after the ramp of voltage $v_1$ begins the sawtooth input to comparator $CP_2$ exceeds voltage $v_B$, causing a positive going transistion to be derived from comparator $CP_2$. Subsequently during the ramp of voltage $V_1$ the sawtooth input to comparator $CP_1$ exceeds voltage $v_A$, causing a negative going transistion in voltage $c_C$ at the output of comparator $CP_1$. In the interval while voltages $v_C$ and $v_D$ are both in a positive state, while the knock occurs, signal $v_E$ at the ouput of gate AND has a binary one value to close switch $SW_1$ to pass the knock portion of sensor 1 to circuit 10. In the interval while at least one of voltages $v_C$ or $v_D$ is in negative state, while only background occurs, signal $v_F$ at the output of inverter INV has a binary one value to close switch $SW_2$ to pass the background portion of sensor 1 to circuit 11.

As described in the foregoing, according to the present invention the output signal of the knocking sensor is subdivided into two portions, i.e. the knocking portion and the rest or the background portion. The difference of the average of both portions is derived to control the ignition advance angle. Accordingly, the ignition advance angle is controlled so it is substantially proportional to the knocking level. To prevent an excessively strong knocking condition, the ignition timing is controlled at a suitable advanced amount to obtain an optimum condition to improve fuel cost and output power characteristics.

What is claimed is:

1. Apparatus for controlling the occurrence times of each ignition pulse of an internal combustion engine comprising
    a sensor for detecting vibration produced by said engine, said sensor deriving an output signal including a background portion and a knock portion while the engine is knocking,
    a signal splitter circuit for splitting the output signal of said sensor into a knocking portion signal and a background portion signal separate from the knocking portion signal, a first means responsive to said knocking portion signal for deriving a first signal having a value commensurate with the intensity of the knocking detected by the sensor, a second means responsive to said background portion signal for deriving a second signal having a value commensurate with the intensity of background vibrations detected by the sensor, comparison means responsive to the first and second signals for deriving a comparison signal having a value commensurate with the relative magnitudes of the intensity of knocking detected by the sensor and of the intensity of background vibrations detected by the sensor, the signal splitter circuit including first and second switches for alternately coupling the output of the sensor to the first and second means in response to the sensor deriving the knock and background portions respectively, means for deriving an intermediate signal having an increasing magnitude as time progresses between each ignition pulse, the rate of increase of the intermediate signal being responsive to the time interval between adjacent ignition pulses so the rate of increase is an inverse function of the time interval, means responsive to the magnitude of the intermediate signal being in a first band between first and second predetermined amplitude levels for coupling the knock portion via the first switch to the first means while blocking coupling of the background portion via the second switch to the second means and responsive to the intermediate signal being in second bands outside of the first band for coupling the background portion via the second switch to the second means while blocking coupling of the knock portion via the first switch to the first means, and means for controlling the occurrence time of the ignition pulses in response to the value of the comparison signal.

2. Apparatus for controlling the occurrence times of each ignition pulse of an internal combustion engine, comprising a sensor for detecting vibration produced by said engine, said sensor deriving an output signal including a background portion and a knock portion while the engine is knocking, a signal splitter circuit for splitting the output signal of said sensor into a knocking portion signal and a background portion signal separate from the knocking portion signal;

a first means responsive to said knocking portion signal for deriving a first signal having a value commensurate with the intensity of the knocking detected by the sensor, a second means responsive to said background portion signal for deriving a second signal having a value commensurate with the intensity of background variations detected by the sensor, comparison means responsive to the first and second signals for deriving a comparison signal having a value commensurate with the relative magnitudes of the intensity of knocking detected by the sensor and of the intensity of background variations detected by the sensor, means for deriving a pulse each time ignition of the engine occurs, and means responsive to the comparison signal and length of interval between first and second immediately adjacent ignition pulses for controlling the occurrence time of a third ignition pulse of the internal combustion engine immediately following the second ignition pulse so that the third ignition pulse occurrence time can be changed by a variable amount determined by the relative magnitudes of the intensities of the detected knock and background variation and between the first and second pulses, the signal splitter circuit including first and second switches for alternately coupling the output of the sensor to the first and second means in response to the sensor deriving the knock and background portions respectively, the signal splitter circuit including means for deriving an intermediate signal having an increasing magnitude as time progresses between each ignition pulse, the rate of increase of the intermediate signal being responsive to the time interval between adjacent ignition pulses so the rate of increase is an increasing function of the time interval, means responsive to the magnitude of the intermediate signal being in a first band, between first and second predetermined amplitude levels, for coupling the knock portion via the first switch to the first means while blocking coupling of the background portion via the second switch to the second means and responsive to the intermediate signal being in second bands outside of the first band for coupling the background portion via the second switch to the second means while blocking coupling of the knock portion via the first switch to the first means.

3. The apparatus of claim 2 wherein the means for deriving the intermediate signal includes a sawtooth generator for deriving a ramp signal in response to each ignition pulse, the ramp signal having a variable slope that is an inverse function of the time interval.

4. The apparatus of claim 2 wherein the means for deriving the intermediate signal includes a sawtooth generator for deriving a ramp signal in response to each ignition pulse, the ramp signal having a variable slope that is an inverse function of the time interval and is susceptible to change during an interval between adjacent ignition pulses occurring immediately after a change in the time interval.

* * * * *